(12) United States Patent
Hyun et al.

(10) Patent No.: US 10,093,282 B2
(45) Date of Patent: Oct. 9, 2018

(54) WIPER BLADE ASSEMBLY

(71) Applicant: CAP Corporation, Sangju-si, Gyeongsangbuk-do (KR)

(72) Inventors: Seung Chul Hyun, Ansan-si (KR); Myoung Yeon Kim, Ulsan (KR)

(73) Assignee: CAP Corporation, Gyeongsangbuk-do (KR)

( * ) Notice: Subject to any disclaimer, the term of this patent is extended or adjusted under 35 U.S.C. 154(b) by 32 days.

(21) Appl. No.: 15/234,570

(22) Filed: Aug. 11, 2016

(65) Prior Publication Data

US 2017/0043749 A1 Feb. 16, 2017

(30) Foreign Application Priority Data

Aug. 20, 2015 (KR) .................. 10-2015-0114337

(51) Int. Cl.
*B60S 1/40* (2006.01)
*B60S 1/38* (2006.01)

(52) U.S. Cl.
CPC ............ *B60S 1/4016* (2013.01); *B60S 1/387* (2013.01); *B60S 2001/4022* (2013.01)

(58) Field of Classification Search
CPC ............ B60S 1/4016; B60S 2001/4022; B60S 1/4019
See application file for complete search history.

(56) References Cited

U.S. PATENT DOCUMENTS

| 8,997,303 B2 | 4/2015 | Song et al. |
| 9,090,231 B2 | 7/2015 | Park et al. |
| 2007/0289079 A1* | 12/2007 | Van Bealen .......... B60S 1/3867 15/250.32 |
| 2010/0005609 A1* | 1/2010 | Kim ........................ B60S 1/387 15/250.32 |
| 2012/0227206 A1* | 9/2012 | Depondt ................. B60S 1/387 15/250.32 |
| 2015/0135464 A1* | 5/2015 | Benner ................. B60S 1/3849 15/250.32 |

FOREIGN PATENT DOCUMENTS

| EP | 0692415 A1 | 1/1996 |
| JP | 1996-049720 A | 2/1996 |
| KR | 10-2012-0066208 A | 6/2012 |
| KR | 10-1198352 B1 | 11/2012 |
| KR | 10-1245363 B1 | 3/2013 |

OTHER PUBLICATIONS

KR101198352A1 (machine translation), 2012.*
Korean Notice of Allowance dated Feb. 6, 2017 for corresponding Korean Patent Application No. 10-2015-0114337.

* cited by examiner

*Primary Examiner* — Andrew A Horton
(74) *Attorney, Agent, or Firm* — Harness, Dickey & Pierce, P.L.C.

(57) ABSTRACT

Disclosed herein is a wiper blade assembly, including: an adaptor; and a cap member connected to a predetermined region of a front of the adaptor to rotate, wherein the cap member includes one or more hollows, the adaptor includes one or more pressing plates, and the cap member is rotated relative to the one or more pressing plates in a state where the one or more pressing plates are inserted in the one or more hollows. Since a wiper arm can be easily attached or detached by the rotation of the cap member, the wipe blade assembly can be easily attached to or detached from the wiper arm even by a beginner.

8 Claims, 9 Drawing Sheets

WIPER BLADE ASSEMBLY

This application claims priority from Korean Patent Application No. 10-2015-0114337 in the Korean Intellectual Property Office, the disclosure of which is incorporated herein by reference in its entirety.

BACKGROUND

1. Field of the Invention

The present invention relates to a wiper blade assembly, and more particularly to a wiper blade assembly, which can easily engage and disengage a wiper arm.

2. Description of the Related Art

A windshield of a vehicle is provided with a wiper blade assembly for ensuring eyesight of a driver by wiping rainwater off or removing foreign materials on rainy days. The wiper blade assembly is engaged with a wiper arm connected with a driving shaft connected to a wiper driving motor of a vehicle, and is driven by the wiper driving motor.

In this case, the wiper blade assembly is engaged with the wiper arm through a wiper connector. Generally, the wiper blade assembly is configured such that an adaptor is provided, a connector member is connected to the adaptor, and the wiper arm is connected to the connector member.

FIG. 1A is a perspective view showing a general wiper blade assembly, FIG. 1B is a perspective view showing a general wiper arm, and FIG. 1C is a perspective view showing a connector member connected with the general wiper arm.

Referring to FIGS. 1A to 1C, the general wiper blade assembly 10 includes a wiper strip (not shown) made of a rubber material and in contact with a vehicle windshield, a pair of spoilers 11, and an adaptor 12 disposed in a predetermined region of the wiper blade assembly in a length direction.

It is shown in FIG. 1A that the adaptor 12 is disposed in the central region of the wiper blade assembly in a length direction. However, unlike this, if necessary, the adaptor 12 may also be disposed the outer region of the wiper blade assembly.

Subsequently referring to FIGS. 1A to 1C, the adaptor 12 of the general wiper blade assembly 10 includes a connector member 13 for engaging a wiper arm 15, and a connector acceptor 14 for accepting the connector member 13.

In this case, the wiper arm are engaged with a driving shaft connected to a wiper driving motor of a vehicle, and the wiper blade assembly 10 is driven by driving the wiper arm.

That is, the general wiper blade assembly is configured such that an adaptor is provided, and a connector member is connected with a predetermined region of the adaptor, that is, a connector acceptor, and the wiper arm is connected with the connector member.

Meanwhile, generally, the connector acceptor includes a hinge shaft (not shown) integrated with the connector acceptor, and thus the connector member may be connected with the hinge shaft.

However, the general wiper blade assembly is disadvantageous in that an additional connector member is needed in order to connect the wiper arm to the adaptor.

Further, this wiper blade assembly is disadvantageous in that, in the connection of the wiper arm to the adaptor, a beginner does not know whether the wiper arm should be engaged with any portion of the wiper blade assembly, and thus the engagement of the wiper arm with the wiper blade assembly is not easy.

Moreover, this wiper blade assembly is disadvantageous in that, in the disconnection of the wiper arm from the adaptor, a beginner cannot easily conduct the disengagement disconnection of the wiper arm from the adaptor, and thus it is difficult to disengage the wiper arm from the wiper blade assembly in order to replace the wiper blade assembly.

SUMMARY

Aspects of the present invention are to provide a wiper blade assembly, which can easily engage and disengage a wiper arm.

However, aspects of the present invention are not restricted to the one set forth herein. The above and other aspects of the present invention will become more apparent to one of ordinary skill in the art to which the present invention pertains by referencing the detailed description of the present invention given below.

According to an aspect of the present invention, there is provided a wiper blade assembly, including: an adaptor; and a cap member connected to a predetermined region of a front of the adaptor to rotate, wherein the cap member includes one or more hollows, the adaptor includes one or more pressing plates, and the cap member is rotated relative to the one or more pressing plates in a state where the one or more pressing plates are inserted in the one or more hollows.

The wiper arm may be a U-shaped hook type wiper arm, and the U-shaped hook type wiper arm may include a longitudinal support and a U-shaped hook located at the front end of the longitudinal support. The wiper blade assembly may further include a top cover connected with the adaptor. The top cover may include a top cover body, a first wiper arm coupling unit located on the top cover body and coupled with the longitudinal support, and a second wiper arm coupling unit located in the front of the top cover body and coupled with the U-shaped hook.

The adaptor may include an adaptor body and a press coupling unit located in front of the adaptor body; the press coupling unit may include a first press coupling unit located at a first side of the adaptor body and a second press coupling unit located at a second side of the adaptor body; the first press coupling unit may include a first elastic piece connected with the adaptor body, a first pressing plate located at the end of the first elastic piece, and a first support protruding from the first pressing plate; and the second press coupling unit may include a second elastic piece connected with the adaptor body, a second pressing plate located at the end of the second elastic piece, and a second support protruding from the second pressing plate.

The one or more hollows may include a first hollow and a second hollow spaced from the first hollow; the one or more pressing plates may include a first pressing plate inserted into the first hollow and a second pressing plate inserted into the second hollow; the cap member may include a cap unit covering the predetermined region of the front of the adaptor and lateral cap portions continuously formed to the cap unit and located at lateral sides of the cap unit; the cap unit may include an upper cap portion covering the upper surface of the front of the adaptor and a front cap portion continuously disposed to the upper cap portion and covering the front of the adaptor; the lateral cap portions may include a first lateral cap portion located at a first lateral side of the cap unit and a second lateral cap portion located at a second lateral side of the cap unit; and the first lateral cap portion may include the first hollow, and the second lateral cap portion may include the second hollow.

The cap member may be rotated such that the front of the adaptor is opened before the engagement of the wiper arm and closed after the engagement of the wiper arm, so as to support the wiper arm.

According to an aspect of the present invention, there is provided a wiper blade assembly, including: an adaptor; and a cap member connected to a predetermined region of a front of the adaptor to rotate, wherein the cap member includes a cap unit covering the predetermined region of the front of the adaptor and lateral cap portions located at lateral sides of the cap unit and including a first hollow and a second hollow spaced from the first hollow, the adaptor includes a first pressing plate inserted into the first hollow, a first support protruding from the first pressing plate, a second pressing plate inserted into the second hollow, and a second support protruding from the second pressing plate, the cap member includes a first locking jaw located at a first side of the inner end of the cap unit and a second locking jaw located at a second side of the inner end of the cap unit and spaced from the first locking jaw, the cap member is not rotated when the first support and the second support support the first locking jaw and the second locking jaw, respectively, and the cap member is rotated when the first support and the second support release the first locking jaw and the second locking jaw, respectively.

The first support and the second support may release the first locking jaw and the second locking jaw, respectively, by pressing the first pressing plate and the second pressing plate to move the first support and the second support inward.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION OF THE EMBODIMENTS

Figure 1A:
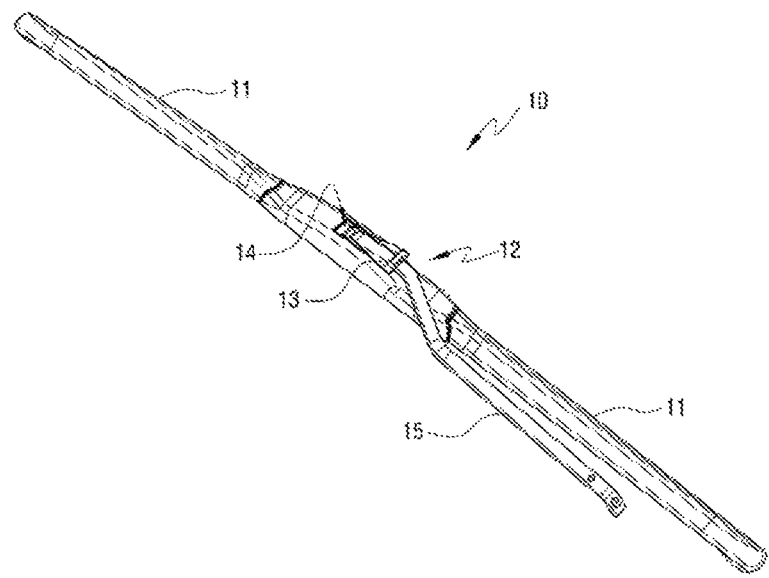
FIG. 1A is a perspective view showing a general wiper blade assembly.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims.

Embodiments of the present invention will be described in detail with reference to the attached drawings. Like numbers refer to like elements throughout. As used herein, the term "and/or" includes any and all combinations of one or more of the associated listed items.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of the present invention.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Hereinafter, preferred embodiments of the present invention will be described in detail with reference to the attached drawings.

Figure 2A:
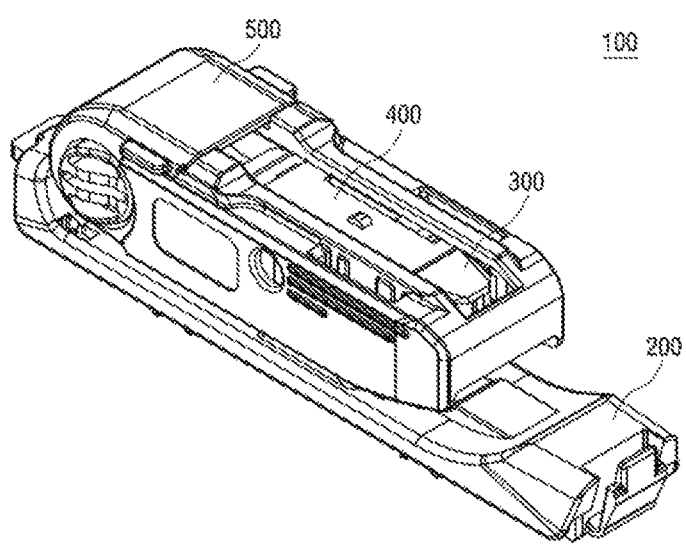
FIG. 2A is a perspective view showing a wiper blade assembly according to the present invention.
Figure 2B:
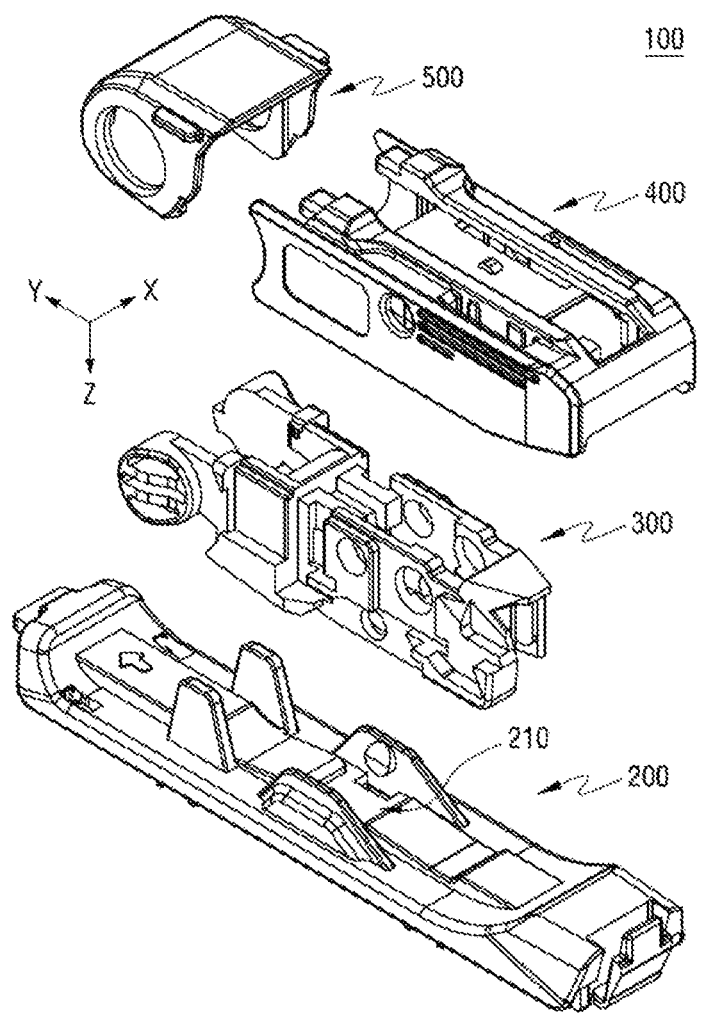
FIG. 2B is an exploded perspective view showing the wiper blade assembly according to the present invention.

FIG. 2A is a perspective view showing a wiper blade assembly according to the present invention, and FIG. 2B is an exploded perspective view showing the wiper blade assembly according to the present invention.

However, in FIGS. 2A and 2B, for the convenience of explanation, a contact member (wiper strip) made of a rubber material and in contact with a vehicle windshield, an elastic member supporting the contact member, and a cover member (spoiler) to be connected with the contact member will be omitted.

First, the wiper blade assembly according to the present invention includes a contact member (not shown) made of a rubber material and in contact with a vehicle windshield, an elastic member (not shown) supporting the contact member, and a pair of cover members (not shown) covering the contact member. Since these omitted components are obvious in the related field, detailed description thereof will be omitted.

Subsequently referring to FIGS. 2A and 2B, the wiper blade assembly 100 according to the present invention includes a connection cover 200 disposed in a predetermined region of the wiper blade assembly 100 and including an accepting portion 210.

The wiper blade assembly 100 according to the present invention may include an adaptor 300 attachable to or detachable from the accepting portion of the connection cover 200, and may also include a top cover 400 connected with the adaptor 300.

Meanwhile, although not shown in FIGS. 2A and 2B, as will be described later, the top cover 400 is connected with a U-shaped hook type wiper arm, and the wiper blade assembly may be operated by the power transferred from the wiper arm.

Further, wiper arms having various forms may be connected directly to the adaptor 300 even when the top cover 400 is removed. Since this is obvious in the related field, detailed description thereof will be omitted.

In this case, the connection cover 200 may be disposed in the central region of the wiper blade assembly 100 in a length direction. Unlike this, if necessary, the connection cover 200 may also be disposed the outer region of the wiper blade assembly 100. Therefore, in the present invention, the position of the connection cover 200 is not limited.

Subsequently referring to FIGS. 2A and 2B, the wiper blade assembly according to the present invention includes a cap member 500 connected to the predetermined region of the front of the adaptor 300 to rotate.

That is, the cap member 500 is connected to the predetermined region of the front of the adaptor 300 to rotate such that the front of the adaptor 300 is opened before the engagement of a U-shaped hook type wiper arm and closed after the engagement of the U-shaped hook type wiper arm, thereby supporting the U-shaped hook type wiper arm through the cap member 500.

Hereinafter, the adaptor, top cover and cap member according to the present invention will be described.

First, the wiper blade assembly according to the present invention includes an adaptor; and a cap member connected to a predetermined region of a front of the adaptor to rotate. Here, the cap member may include one or more hollows, and the adaptor may include one or more pressing plates. The cap member may be rotated according to the one or more pressing plates in a state where the one or more pressing plates are inserted in the one or more hollows.

In this case, the one or more hollows may include a first hollow and a second hollow spaced from the first hollow, and the one or more pressing plates may include a first pressing plate inserted into the first hollow and a second pressing plate inserted into the second hollow.

Hereinafter, the present invention will be described in detail with reference to the attached drawings.

Figure 3:
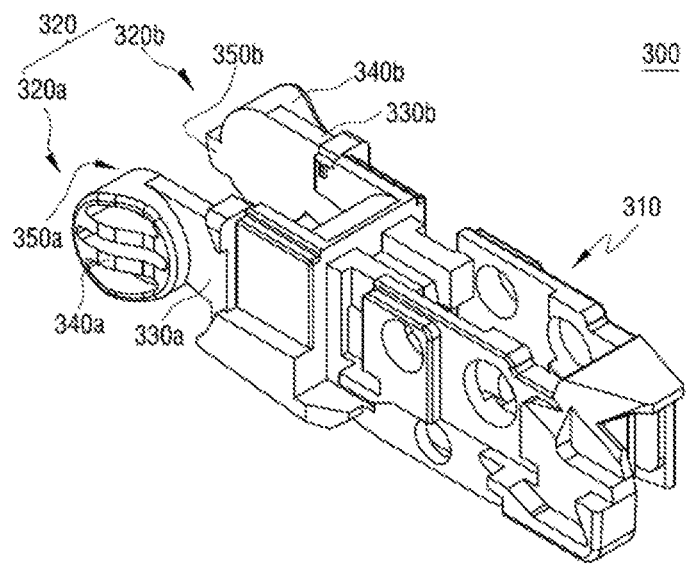
FIG. 3 is a perspective view showing an adaptor according to the present invention.

FIG. 3 is a perspective view showing an adaptor according to the present invention.

Referring to FIG. 3, the adaptor 300 according to the present invention includes an adaptor body 310 and a press coupling unit 320 located in front of the adaptor body 310.

The press coupling unit 320 includes a first press coupling unit 320a located at a first side of the adaptor body 310 and a second press coupling unit 320b located at a second side of the adaptor body 310.

The first press coupling unit 320a includes a first elastic piece 330a connected with the adaptor body 310 and a first pressing plate 340a. The second press coupling unit 320b includes a second elastic piece 330b connected with the adaptor body 310 and a second pressing plate 340b.

The first press coupling unit 320a includes a first support 350a protruding from the first pressing plate 340a. The second press coupling unit 320b includes a second support 350b protruding from the second pressing plate 340b.

The first support 350a and the second support 350b support or release first locking jaw and second locking jaw to be described later, respectively, thereby enabling the rotation of the cap member.

That is, when the first pressing plate 340a and the second pressing plate 340b are pressed in the X direction of FIG. 2B, the first pressing plate 340a and the second pressing plate 340b move the first support 350a and the second support 350b in the X direction of FIG. 2B, respectively while the elasticity of the first pressing plate 340a and the second pressing plate 340b are respectively maintained by the first elastic piece 330a and the second elastic piece 330b, and the moved first support 350a and second support 350b release the first locking jaw and the second locking jaw of the cap member, thereby enabling the rotation of the cap member.

This will be described later.

Figure 4:
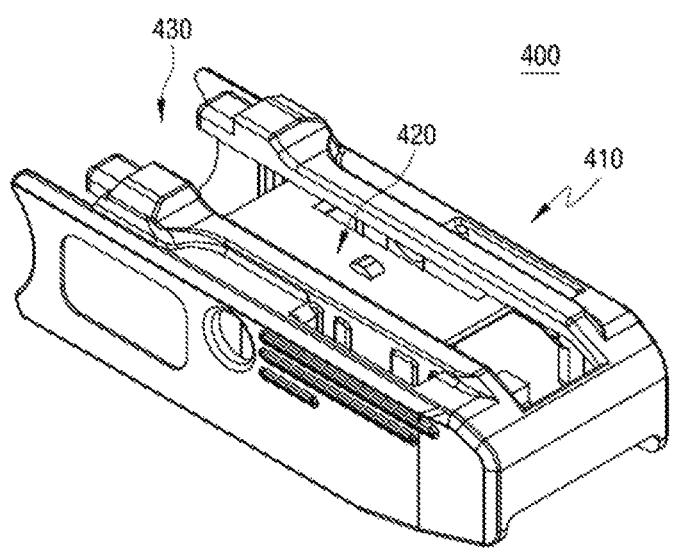
FIG. 4 is a perspective view showing a top cover according to the present invention.

FIG. 4 is a perspective view showing a top cover according to the present invention.

Referring to FIG. 4, the top cover 400 is connected with the adaptor 300, and is provided with a U-shaped hook type wiper arm.

More specifically, the top cover 400 includes a top cover body 410, and includes U-shaped hook type wiper arm coupling units 420 and 430 located in a predetermined region of the top cover body 410.

Figure 8:
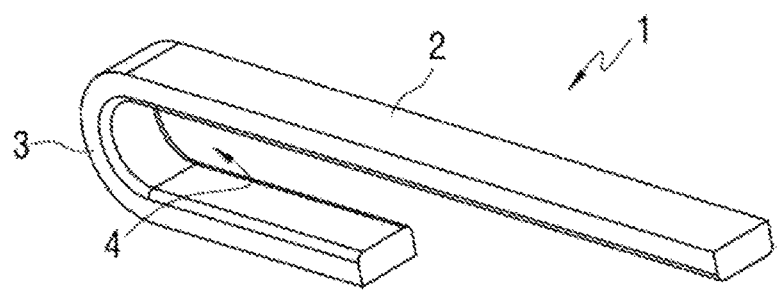
FIG. 8 is a schematic perspective view showing a general U-shaped hook type wiper arm.

FIG. 8 is a schematic view showing a general U-shaped hook type wiper arm.

Referring to FIG. 8, the general U-shaped hook type wiper arm 1 includes a longitudinal support 2 and a U-shaped hook 3 located at the front end of the longitudinal support 2.

In this case, the U-shape hook 3 may be provided with an inner circumference.

Referring to FIGS. 4 and 8, the top cover 400 according to the present invention may include a first wiper arm coupling unit 420 located on the top cover body 410 and coupled with the longitudinal support 2 of the U-shaped hook type wiper arm 1, and a second wiper arm coupling unit 430 located in the front of the top cover body 410 and coupled with the U-shaped hook 3 of the U-shaped hook type wiper arm 1.

That is, the U-shaped hook type wiper arm 1 may be coupled with the top cover 400 in a state where the longitudinal support 2 of the U-shaped hook type wiper arm 1 is disposed on the first wiper arm coupling unit 420 and the U-shaped hook 3 of the U-shaped hook type wiper arm 1 is disposed on the second wiper arm coupling unit 430.

Figure 5A:
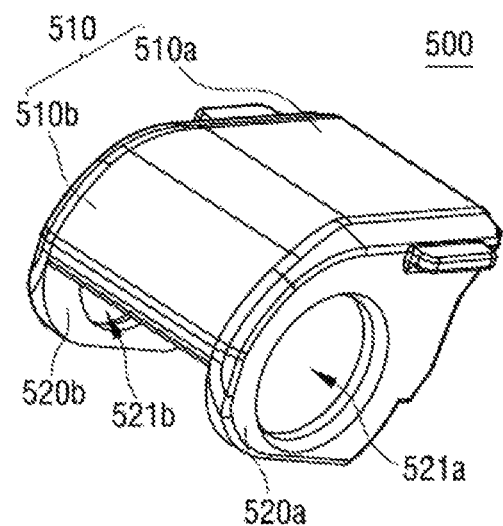
FIGS. 5A and 5B are perspective views showing a cap member according to the present invention.
Figure 5B:
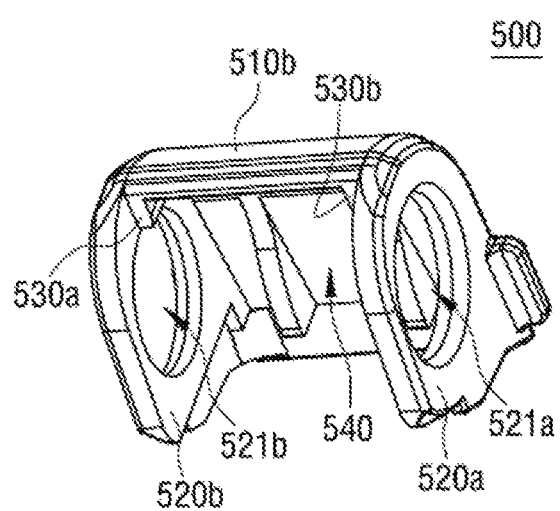

FIGS. 5A and 5B are perspective views showing a cap member according to the present invention.

As described above, the cap member 500 is configured to be connected to the predetermined region of the front of the adaptor 300 to rotate. More specifically, referring to FIGS. 5A and 5B, the cap member 500 includes a cap unit 510 covering the predetermined region of the front of the adaptor 300. The cap unit 510 includes an upper cap portion 510a covering the upper surface of the front of the adaptor 300 and a front cap portion 510b continuously disposed to the upper cap portion 510a and covering the front of the adaptor 300.

Further, the cap member 500 includes lateral cap portions 520a and 520b continuously formed to the cap unit 510 and located at lateral sides of the cap unit 510.

In this case, the lateral cap portions 520a and 520b include a first lateral cap portion 520a located at a first lateral side of the cap unit 510 and a second lateral cap portion 520b located at a second lateral side of the cap unit 510.

Further, the first lateral cap portion 520a includes a first hollow 521a into which the aforementioned first pressing plate 340a of the adaptor 300 is inserted, and the second lateral cap portion 520b includes a second hollow 521b into which the aforementioned second pressing plate 340b of the adaptor 300 is inserted.

That is, the cap member 500 is rotated relative to the adaptor 300 in a state where the first pressing plate 340a of the adaptor 300 is inserted in the first hollow 521a of the cap member 500 and the second pressing plate 340b of the adaptor 300 is inserted in the second hollow 521b of the cap member 500.

Subsequently referring to FIGS. 5A and 5B, the cap member 500 includes a first locking jaw 530a located at a first side of the inner end of the front cap portion 510b and a second locking jaw 530b located at a second side of the inner end of the front cap portion 510b and spaced from the first locking jaw 530a.

Meanwhile, the cap member 500 may further include a wiper arm support 540 located beneath the lower surface of the inner side of the upper cap portion 510a. However, in the present invention, the presence of the wiper arm support 540 is not limited.

Hereinafter, the connection and rotation of the cap member according to the present invention will be described.

Figure 6A:
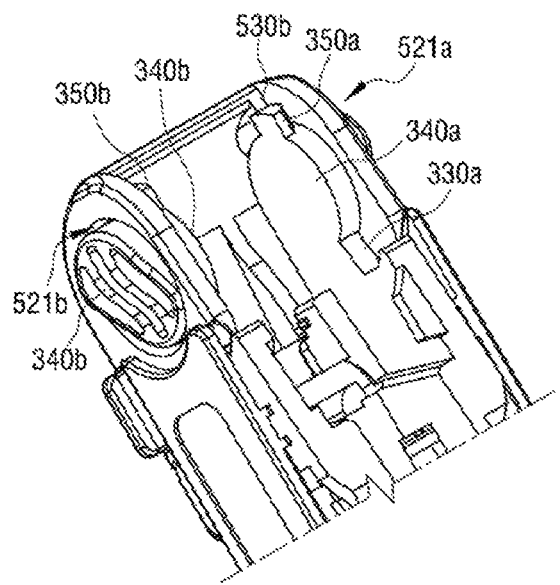
FIGS. 6A and 6B are perspective views explaining the rotation of the cap member according to the present invention, as viewed from a first direction.
Figure 6B:
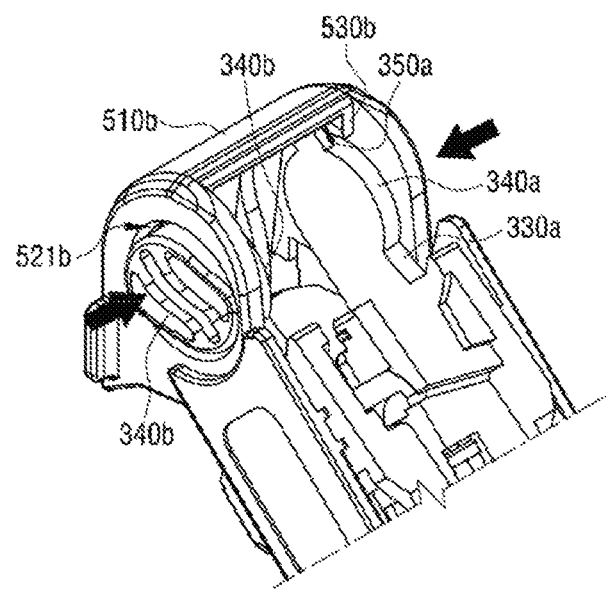
Figure 7A:
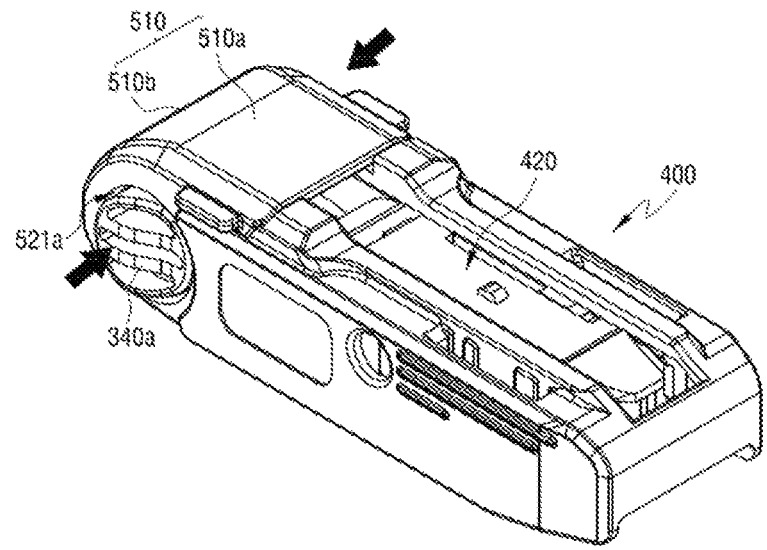
FIGS. 7A and 7B are perspective views explaining the rotation of the cap member according to the present invention, as viewed from a second direction.
Figure 7B:
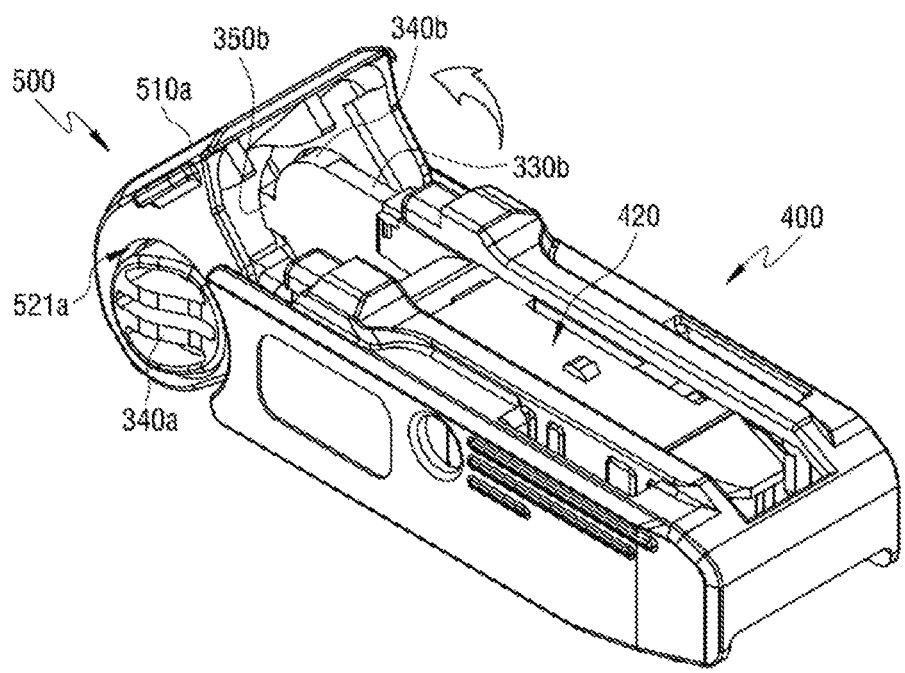

FIGS. 6A and 6B are perspective views explaining the rotation of the cap member according to the present invention, as viewed from a first direction, and FIGS. 7A and 7B are perspective views explaining the rotation of the cap member according to the present invention, as viewed from a second direction. In this case, the first direction corresponds to the lower surface of the cap member, and the second direction corresponds to the upper surface of the cap member.

Referring to FIGS. 6 and 7, as described above, the wiper blade assembly according to the present invention includes an adaptor attached to or detached from a connection cover; a top cover connected with the adaptor; and a cap member connected to a predetermined region of the front of the adaptor to rotate.

In the connection of the adaptor with the cap member, the first lateral cap portion 520a of the cap member includes the first hollow 521a inserted into the first pressing plate 340a of the adaptor, and the second lateral cap portion 520b of the cap member includes the second hollow 521b inserted into the second pressing plate 340b of the adaptor. In this case, the first pressing plate 340a of the adaptor is inserted into the first hollow 521a of the cap member, and the second pressing plate 340b of the adaptor is inserted into the second hollow 521b of the cap member, thereby connecting the adaptor with the cap member.

Further, since the cap unit 510 includes the upper cap portion 510a covering the upper surface of the front of the adaptor and the front cap portion 510b continuously disposed to the upper cap portion 510a and covering the front of the adaptor, the cap unit 510 of the cap member covers the predetermined region of the front of the adaptor.

Meanwhile, as shown in FIG. 6A, since the first support 350a and second support 350b of the adaptor support the first locking jaw 530a and second locking jaw 530b of the cap member, respectively, in a state where the cap portions of the cap member cover the predetermined region of the front of the adaptor, the cap member is fixed without rotation.

However, in the case where a user intends to release the covering of the cap member by rotating the cap member covering the predetermined region of the front of the adaptor, as shown in FIGS. 6B and 7B, the first pressing plate 340a and the second pressing plate 340b are pressed to move the first support 350a and the second support 350b inward, and the moved first support 350a and second support 350b release the first locking jaw 530a and second locking jaw 530b, thereby enabling the rotation of the cap member.

Figure 9A:
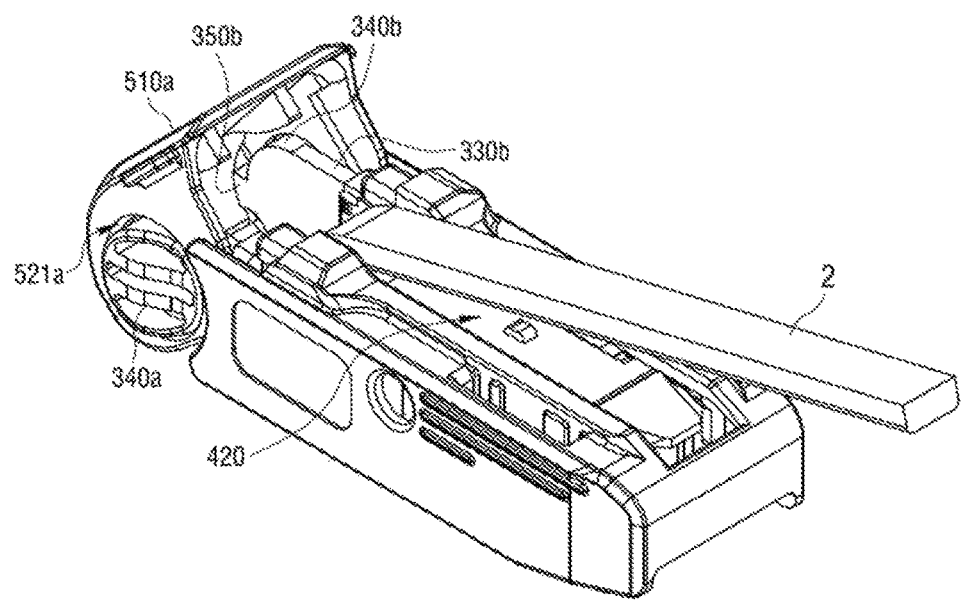
FIGS. 9A and 9B are perspective views showing a method of engaging the U-shaped hook type wiper with the wiper blade assembly according to the present invention.
Figure 9B:
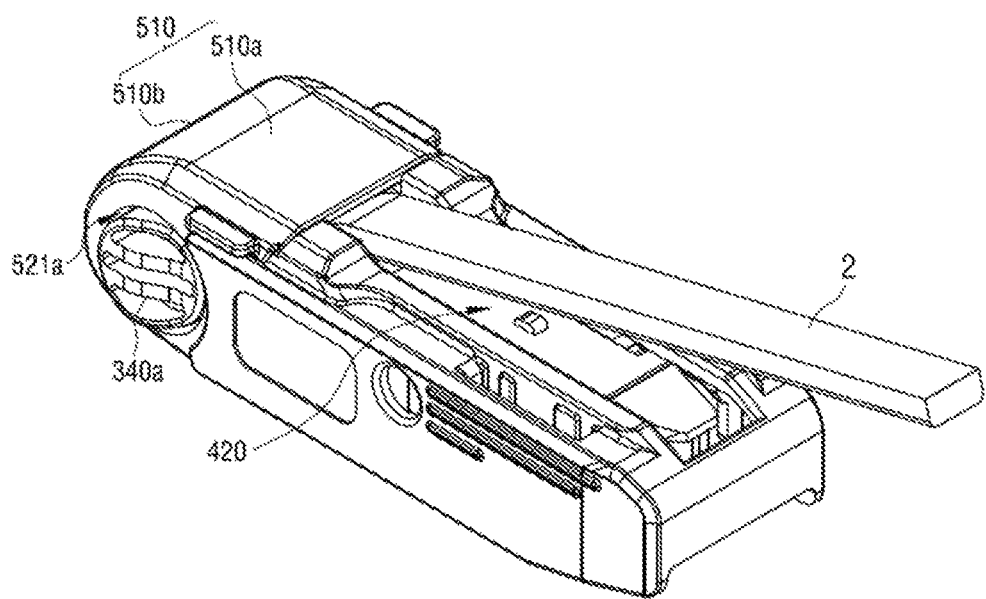

FIGS. 9A and 9B are perspective views showing a method of engaging the U-shaped hook type wiper to the wiper blade assembly according to the present invention.

First, referring to FIG. 9A, as described above with reference to FIGS. 6 and 7, in order to engage the U-shaped hook type wiper with the wiper blade assembly, a user rotates the cap member to release the covering of the predetermined region of the front of the adaptor with the cap member. Since the rotation mechanism of the cap member has been described as above, detailed description thereof will be omitted.

That is, the covering of the predetermined region of the front of the adaptor with the cap member is released by the rotation of the cap member, and thus the U-shaped hook type wiper is engaged with the wiper blade assembly in this state.

In the engagement of the U-shaped hook type wiper with the wiper blade assembly, as described above with reference to FIG. 4, the U-shaped hook type wiper arm may be coupled with the top cover 400 in a state where the longitudinal support 2 of the U-shaped hook type wiper arm is disposed on the first wiper arm coupling unit 420 and the U-shaped hook 3 of the U-shaped hook type wiper arm is disposed on the second wiper arm coupling unit 430.

In this case, in the state of FIG. 9A, that is, in the state where the covering of the predetermined region of the front of the adaptor with the cap member is released, the U-shaped hook type wiper arm is easily detached from the top cover.

Therefore, in the present invention, as shown in FIG. 9B, the cap member covers the predetermined region of the front of the adaptor by rotating the cap member, and thus the cap member supports the U-shaped hook type wiper arm, thereby preventing the U-shaped hook type wiper arm from being detached from the top cover.

That is, the cap member 500 is connected to the predetermined region of the front of the adaptor to rotate such that the front of the adaptor is opened before the engagement of the U-shaped hook type wiper arm and closed after the engagement of the U-shaped hook type wiper arm, thereby supporting the U-shaped hook type wiper arm through the cap member 500.

Figure 1B:
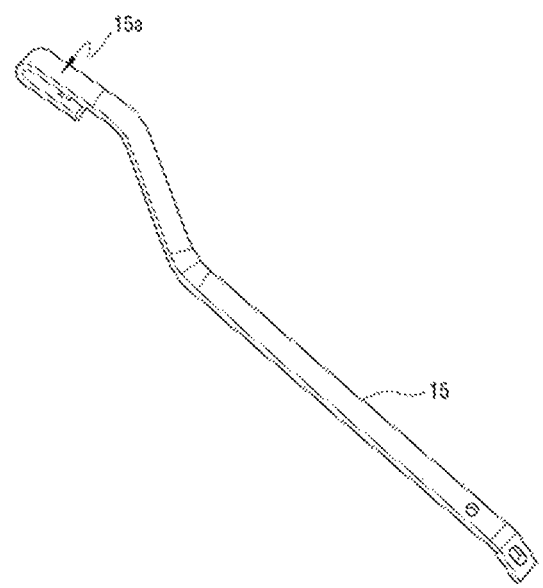
FIG. 1B is a perspective view showing a general wiper arm.
Figure 1C:
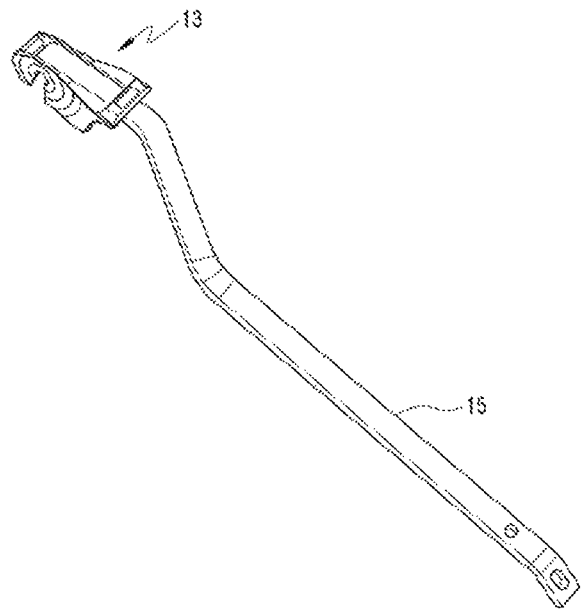
FIG. 1C is a perspective view showing a connector member connected with the general wiper arm.

As described above, the general wiper blade assembly shown in FIGS. 1A to 1c is disadvantageous in that, in the connection of the wiper arm to the adaptor, a beginner does not know whether the wiper arm should be engaged with any portion of the wiper blade assembly, and thus the engagement of the wiper arm with the wiper blade assembly is not easy.

Further, this wiper blade assembly is disadvantageous in that, in the disconnection of the wiper arm from the adaptor, a beginner cannot easily conduct the disconnection of the wiper arm from the adaptor.

However, in the present invention, the covering of the predetermined region of the front of the adaptor with the cap member is released by the rotation of the cap member, the U-shaped hook type wiper arm is disposed on the wiper arm coupling units, and then the cap member is rotated again to cover the predetermined region of the front of the adaptor, thereby supporting the U-shaped hook type wiper arm through the cap member.

Therefore, in the present invention, the wiper arm can be easily attached or detached by the rotation of the cap member, and thus the wipe blade assembly according to the present invention can be easily attached to or detached from the wiper arm even by a beginner.

Although the preferred embodiments of the present invention have been disclosed for illustrative purposes, those skilled in the an will appreciate that various modifications, additions and substitutions are possible, without departing from the scope and spirit of the invention as disclosed in the accompanying claims.

What is claimed is:

1. A wiper blade assembly, which is engaged with a wiper arm, comprising:
   an adaptor; and
   a cap member connected to a region of a front of the adaptor to rotate,
   wherein the cap member includes a first hollow and a second hollow spaced from the first hollow,
   wherein the adaptor includes a first pressing plate inserted into the first hollow and a second pressing plate inserted into the second hollow,
   wherein the cap member is configured to rotate relative to the first pressing plate and the second pressing plate in a state where the first pressing plate and the second pressing plate are inserted into the first hollow and the second hollow, respectively,
   wherein the adaptor includes an adaptor body and a press coupling unit located in front of the adaptor body,
   wherein the press coupling unit includes a first press coupling unit located at a first side of the adaptor body and a second press coupling unit located at a second side of the adaptor body,
   wherein the first press coupling unit includes a first elastic piece connected to the adaptor body, a first pressing plate located at an end of the first elastic piece, and a first support protruding from the first pressing plate,
   wherein the second press coupling unit includes a second elastic piece connected to the adaptor body, a second pressing plate located at an end of the second elastic piece, and a second support protruding from the second pressing plate,
   wherein one side of the first pressing plate is located at the end of the first elastic piece and the first support is located at the other side of the first pressing plate, and
   wherein one side of the second pressing plate is located at the end of the second elastic piece and the second support is located at the other side of the second pressing plate.

2. The wiper blade assembly of claim 1,
   wherein the wiper arm is a U-shaped hook type wiper arm, and the U-shaped hook type wiper arm includes a longitudinal support and a U-shaped hook located at a front end of the longitudinal support,
   wherein the wiper blade assembly further includes a top cover connected with the adaptor, and
   wherein the top cover includes a top cover body, a first wiper arm coupling unit located on the top cover body and coupled with the longitudinal support, and a second wiper arm coupling unit located in the front of the top cover body and coupled with the U-shaped hook.

3. The wiper blade assembly of claim 1,
   wherein the cap member includes a cap unit covering the region of the front of the adaptor and lateral cap portions continuously formed to the cap unit and located at lateral sides of the cap unit,
   wherein the cap unit includes an upper cap portion covering an upper surface of the front of the adaptor and a front cap portion continuously disposed to the upper cap portion and covering the front of the adaptor,
   wherein the lateral cap portions include a first lateral cap portion located at a first lateral side of the cap unit and a second lateral cap portion located at a second lateral side of the cap unit, and
   wherein the first lateral cap portion includes the first hollow, and the second lateral cap portion includes the second hollow.

4. The wiper blade assembly of claim 3,
   wherein the cap member is configured to rotate such that the front of the adaptor is opened before the wiper arm is engaged and is closed after the wiper arm has been engaged.

5. The wiper blade assembly of claim 1, wherein the first elastic piece and the second elastic piece have elasticity.

6. A wiper blade assembly, comprising:
   an adaptor; and
   a cap member connected to a region of a front of the adaptor to rotate,
   wherein the cap member includes a cap unit covering the region of the front of the adaptor and lateral cap portions located at lateral sides of the cap unit, and including a first hollow and a second hollow spaced from the first hollow,
   wherein the adaptor includes a first elastic piece, a first pressing plate which is located at an end of the first elastic piece and is inserted into the first hollow, a first support protruding from the first pressing plate, a second elastic piece, a second pressing plate which is located at an end of the second elastic piece and is inserted into the second hollow, and a second support protruding from the second pressing plate,
   wherein the cap member includes a first locking jaw located at a first side of an inner end of the cap unit and a second locking jaw located at a second side of the inner end of the cap unit and spaced from the first locking jaw,
   wherein the cap member is configured not to rotate in a state where the first support and the second support support the first locking jaw and the second locking jaw, respectively,
   wherein the cap member is configured to rotate in a state where the first support and the second support release the first locking jaw and the second locking jaw, respectively, wherein one side of the first pressing plate is located at the end of the first elastic piece and the first support is located at the other side of the first pressing plate, and wherein one side of the second pressing plate is located at the end of the second elastic piece and the second support is located at the other side of the second pressing plate.

7. The wiper blade assembly of claim 6, wherein the first support and the second support release the first locking jaw and the second locking jaw, respectively, by pressing the first pressing plate and the second pressing plate to move the first support and the second support inward.

8. The wiper blade assembly of claim 6, wherein the first elastic piece and the second elastic piece have elasticity.

* * * * *

UNITED STATES PATENT AND TRADEMARK OFFICE
CERTIFICATE OF CORRECTION

PATENT NO. : 10,093,282 B2
APPLICATION NO. : 15/234570
DATED : October 9, 2018
INVENTOR(S) : Seung Chul Hyun et al.

Page 1 of 1

It is certified that error appears in the above-identified patent and that said Letters Patent is hereby corrected as shown below:

On the Title Page

Column 1, Line 18 the correct Foreign Application Priority Data should read as:
August 13, 2015 (KR) ......................10-2015-0114337

Signed and Sealed this
Fourth Day of December, 2018

Andrei Iancu
*Director of the United States Patent and Trademark Office*